(12) United States Patent
Bjornsson (10) Patent No.: US 7,188,732 B2
(45) Date of Patent: Mar. 13, 2007

(54) METHOD FOR MANUFACTURING OF A LIQUID CLEANER AND CLEANER MANUFACTURED BY SAID METHOD

(76) Inventor: Aegir Bjornsson, Vallgatan 17, S-450 43 Smögen (SE)

( * ) Notice: Subject to any disclaimer, the term of this patent is extended or adjusted under 35 U.S.C. 154(b) by 0 days.

(21) Appl. No.: 10/417,029

(22) Filed: Apr. 16, 2003

(65) Prior Publication Data
US 2004/0011733 A1   Jan. 22, 2004

Related U.S. Application Data

(63) Continuation of application No. PCT/SE01/02299, filed on Oct. 19, 2001.

(51) Int. Cl.
*B01D 27/07* (2006.01)
(52) U.S. Cl. ............ 210/350; 210/439; 210/440; 210/442; 210/453; 210/455; 210/497.1
(58) Field of Classification Search ........ 210/350–352, 210/439, 497.01, 497.1, 497.2, 508, 440–442, 210/453, 455
See application file for complete search history.

(56) References Cited

U.S. PATENT DOCUMENTS

| | | | |
|---|---|---|---|
| 2,175,775 A | 10/1939 | Hurn | |
| 2,714,964 A | 8/1955 | Radford | |
| 3,572,509 A * | 3/1971 | Dexter | ........... 210/130 |
| 4,915,837 A * | 4/1990 | Verity | ........... 210/456 |
| 5,902,364 A | 5/1999 | Tokar et al. | |

FOREIGN PATENT DOCUMENTS

| | | | |
|---|---|---|---|
| GB | 2119272 A | * | 11/1983 |
| GB | 2204250 A | * | 11/1988 |

* cited by examiner

*Primary Examiner*—Matthew O. Savage
(74) *Attorney, Agent, or Firm*—Gauthier & Connors, LLP (57) ABSTRACT

The present invention relates to a method for the production of liquid cleaners, consisting of a cleaner housing with a cleaning chamber exhibiting an inner and an outer end, and a cleaning insert arranged inside the cleaning chamber. The cleaner housing is given a conical shape such that the cleaning chamber receives a smaller lateral dimension at its inner end than at its outer end, said outer end being openable. The cleaning insert is manufactured from a fluid-permeable, compressible cleaning material with a lateral dimension that in an initial state, outside the cleaner housing, exceeds the smaller lateral dimension of the cleaning chamber. The other end of the cleaner housing is kept open, and the cleaning insert is inserted into said other end having the larger lateral dimension, and is pressed into the cleaning chamber towards the end having the smaller lateral dimension. Hereby, the cleaning insert is continuously compressed into receiving, at its inner end, said smaller lateral dimension, causing the cleaning material of cleaning insert to be gradually compacted, seen in the axial direction, at least in a portion at the inner end of the cleaner housing. The invention also relates to a liquid cleaner, produced by the method.

6 Claims, 8 Drawing Sheets

METHOD FOR MANUFACTURING OF A LIQUID CLEANER AND CLEANER MANUFACTURED BY SAID METHOD

This application is a continuation of International Patent Application PCT/SE01/01102299 filed on Oct. 19, 2001, which claims the benefit of Swedish Patent Application 3789-5 filed on Oct. 20, 2000.

TECHNICAL FIELD

The present invention relates to a method for the manufacture of liquid cleaners according to the preamble of the accompanying claim 1.

The present invention also relates to a liquid cleaner manufactured by means of said method, according to the preamble of the accompanying claim 3.

BACKGROUND ART

A multitude of liquid filters is previously known for filtering liquids used for various purposes. For example, when filtering lubricating oil for internal combustion engines, the oil is circulated between an oil reservoir and the lubrication points, the oil being brought to pass through an oil filter during the circulation. The filter is typically located in a so-called shunt or by-pass line so as to clean a fraction of the oil during each circulation passage. However, up to now, only a limited cleaning degree has been achieved, causing the oil to successively age and deteriorate with regard to its properties. Thus, up to now, you have been required to exchange the oil after a certain limited time.

Taking care of used oil is a very substantial environmental problem, not least if regarded worldwide, and therefore an improved degree of cleaning would result in large gains with regard to environment as well as economy. By extending the service life of certain types of liquids, such as oils, to a large extent being extracted from nature, the natural resources of the earth would be extended substantially.

DISCLOSURE OF INVENTION

The object of the present invention is to provide a method, and a liquid cleaner, through which the service life of the liquid may be extended substantially, resulting in large gains with regard to environment as well as economy.

Said object is achieved by means of a method and a liquid cleaner according to the invention, the characteristics of which are defined in the appended claims 1 and 3, respectively.

BRIEF DESCRIPTION OF DRAWINGS

The invention will be described below by means of some embodiment examples, with reference to the enclosed drawings, of which:

FIG. 6 is an exploded perspective view of the liquid cleaner according to FIGS. 1 and 2, illustrating the method according to the invention, whereas

PREFERRED EMBODIMENT

Figure 1:
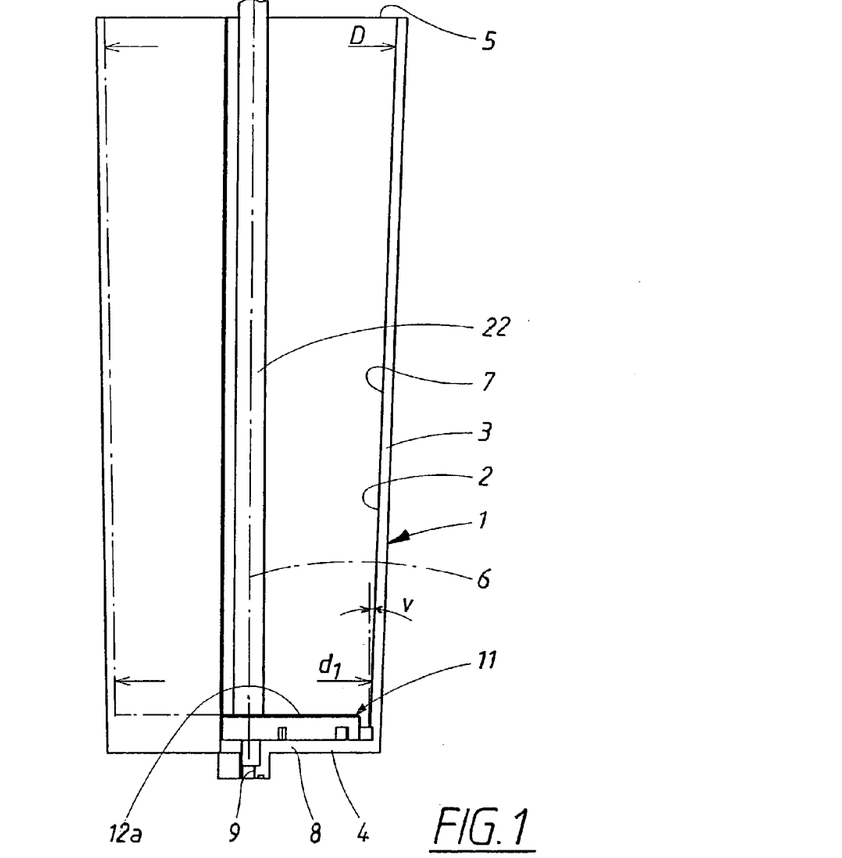
FIG. 1 shows a side view, partly in section, of a cleaner housing in a first embodiment, without the cleaning insert and temporarily with one end open.
Figure 2:
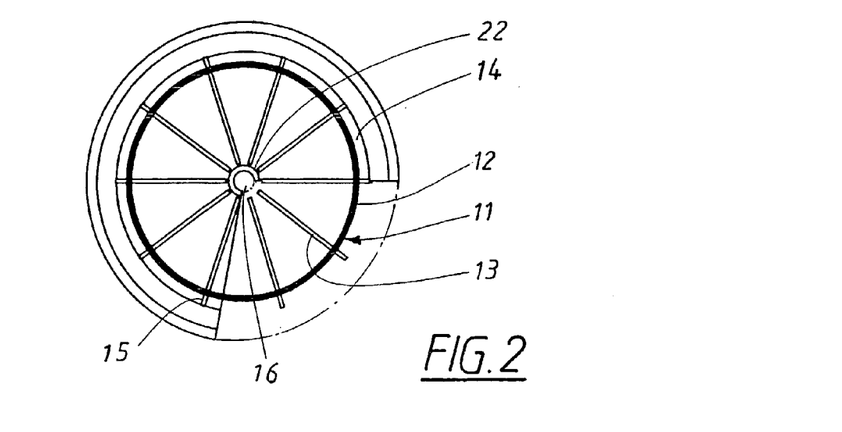
FIG. 2 is a partly sectioned top view of the cleaner housing, seen from the open end.

As can be gathered from FIGS. 1 and 2, the liquid cleaner according to the invention comprises a cleaner housing defining a cleaning chamber 2. More precisely, the cleaner housing consists of an enveloping casing wall 3, made of a rigid, shape permanent, i.e. not easily deformed, material, such as metal, rigid plastic, rigid cardboard or similar, which is liquid-resistant and impermeable. The cleaner housing exhibits, at its bottom end, an end wall portion 4, whereas the housing in an initial stage is open, i.e. has an aperture 5 at the opposite or top end. The aperture 5 preferably has the same size as the cross-sectional dimension of the cleaning chamber at the open end, or more precisely, does not fall below this cross-sectional dimension. In the final state of the liquid cleaner, head covers are provided for sealing off the open end, to be described below.

Preferably, the cleaner housing 1, or at least the cleaning chamber 2, are rotationally symmetrical about a geometrical longitudinal axis 6, in the illustrated example circular, i.e. exhibit a circular cross-section such as shown in FIG. 2. For the sake of illustration, a section is cut away in both FIGS. 1 and 2.

According to the invention, the cleaner housing 1, and more precisely its cleaning chamber 2, is sized with a lateral dimension, in the illustrated example a diameter $d_1$, at one end of the cleaning chamber, i.e. at the end wall portion 4, which is smaller than the lateral dimension, in the illustrated example the diameter D, at the other end of the cleaning chamber, i.e. at the aperture 5. Hereby, the cleaning chamber 2 narrows somewhat towards its lower end, i.e. its shape will be slightly conical, that is, the inner surface 7 of the casing wall 3 is conical, giving the cleaner housing, or at least the cleaning chamber, the shape of a frustrum of a cone, in the illustrated example turned upside down, i.e. following a preferably linear generatrix. In other words, the cleaning chamber 2 is continuously tapering from its open to its closed end.

The diameter difference could vary from application to application, and is also dependent on the height of the cleaning chamber and of the magnitude of the diameters, but a typical interval could be a few millimetres to a few centimetres.

Figure 6:
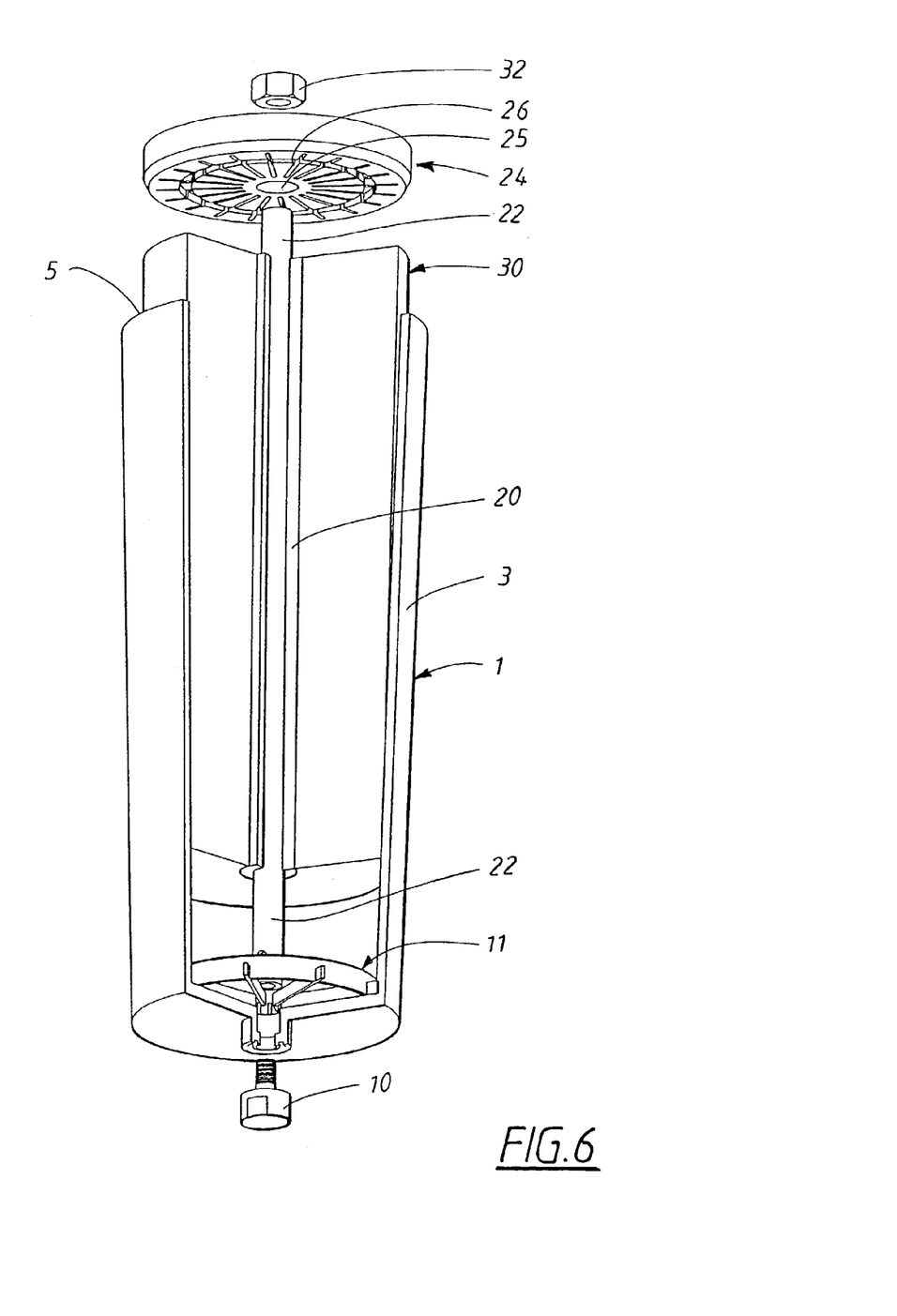

The cleaner housing 1 exhibits, at its end portion 4, a closed lower end wall 8 having a drain hole 9, closed off by means of a drain plug 10, see FIG. 6. The plug preferably has a threaded portion for screwing it into the drain hole. On the inside of the end wall in the cleaning chamber 2, a bottom element 11 is arranged, for example being a detachable element resting on the inside of the end portion 4. The bottom element 11 is shaped like a wheel, with a circumferential ring portion 12 and a plurality of radial spokes 13.

The ring portion 12 and the spokes 13 define upstanding flanges, the ring portion having a diameter selected so as to define a clearance 14 to the inside wall surface 7 of the cleaning chamber. This clearance 14 is maintained through the spokes 13 having portions extending beyond the ring 12 and defining radial distance elements 15 for the bottom element. The spokes 13 exhibit a lower height than the ring portion 12, which is furthermore tapered or pointed upwards so as to create a knife-edge shaped circumferential top edge 12a for penetration into the cleaning insert, to be described in further detail below. The spokes 13 are more blunt than the top edge of the ring portion, in order to define a support for the lower end surface of the cleaning insert. The spokes 13 form axial distance ribs for keeping the cleaning insert at a distance from the bottom of the cleaner housing. The bottom element 11 exhibits a hub 22 in the shape of a tube extending upwards through the entire cleaner housing. The tube 22 is arranged to be coaxial with the cleaner housing, that is, symmetric in relation to the geometrical longitudinal axis 6. The tube has an opening 16 at the bottom for allowing the cleaned fluid to enter, which is to be described further below.

Figure 3:
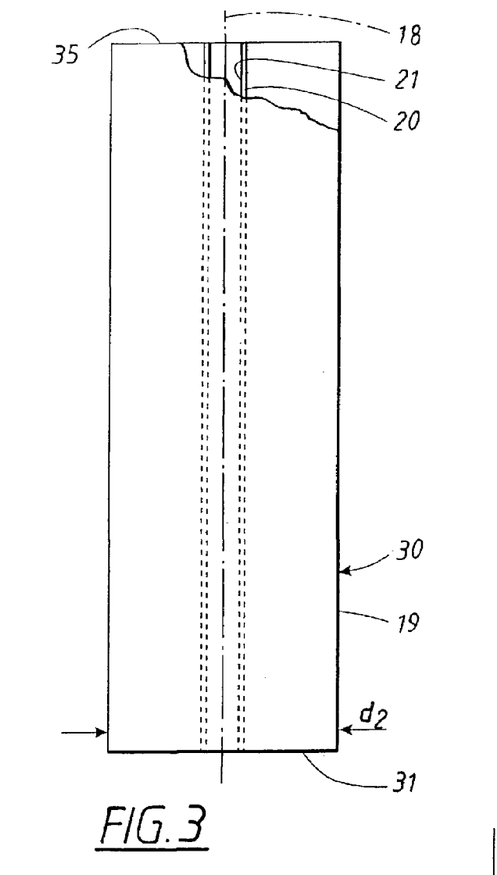
FIG. 3 is a partly sectioned side view of a cleaning insert, in a first state, placed outside of the cleaner housing.
Figure 4:
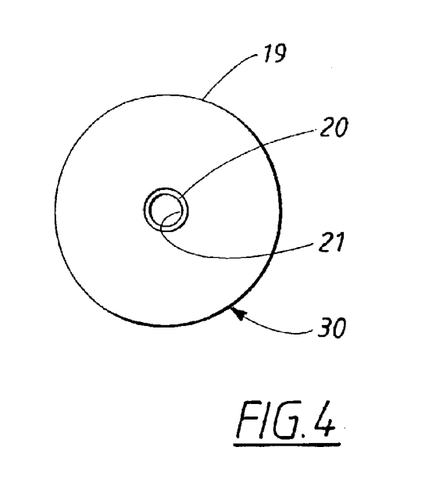
FIG. 4 shows the cleaning insert viewed from one end in its state outside of the housing.
Figure 5:
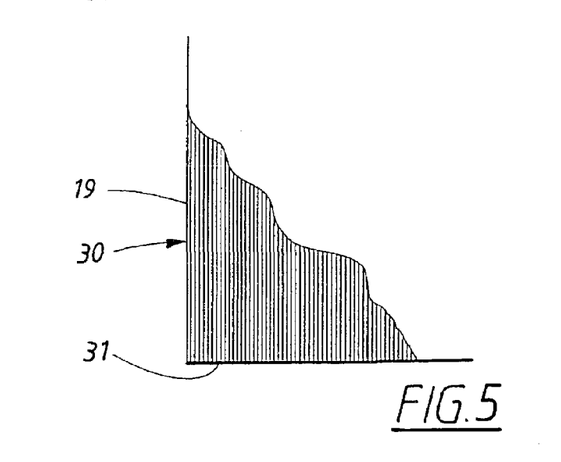
FIG. 5 is a much enlarged, partly broken, detail view of a portion of the cleaning insert according to the invention.

The liquid cleaner comprises, according to the invention, a cleaning insert 30, showed separately in FIGS. 3, 4 and 5. The cleaning insert is made of a liquid-permeable cleaning material that functions to allow liquid to pass axially, i.e. parallel with the longitudinal axis 18 of the cleaning insert. According to the invention, the cleaning insert exhibits a lateral cross-section dimension exceeding the lateral cross-section dimension of the cleaning chamber at one of its ends, in the illustrated example the lower end. As the cleaning insert has a cross-section equal in shape to that of the cleaning chamber; the cross-section is circular, i.e. exhibits a circular circumference 19, the diameter $d_2$ of the cleaning insert is larger than the diameter $d_1$ of the cleaning chamber at its lower end. Preferably, the cleaning insert in its initial state, i.e. outside of the cleaner housing, is cylindrical, that is, exhibits the same lateral dimension or diameter at the top as at the bottom of the cleaning insert. The cleaning insert is further made of a compressible material, preferably tubular fibres, such as cellulose fibres in the form of paper wound around a core 20 made of a rigid material, e.g. cardboard. The core is preferably designed like a tube with an internal cavity 21, the diameter of which is larger than the external diameter of the central tube 22 of the cleaner housing.

FIG. 5 illustrates a partly broken section, indicating in a simplified manner the wound layers of the cleaning insert. The cellulose paper is thus formed of a continuous web with its principal fibre direction located laterally, across the longitudinal direction of the web. The winding is performed with a highly stretched web, such that the paper layers are tightly wound, without any clearance between layers.

Figure 7:
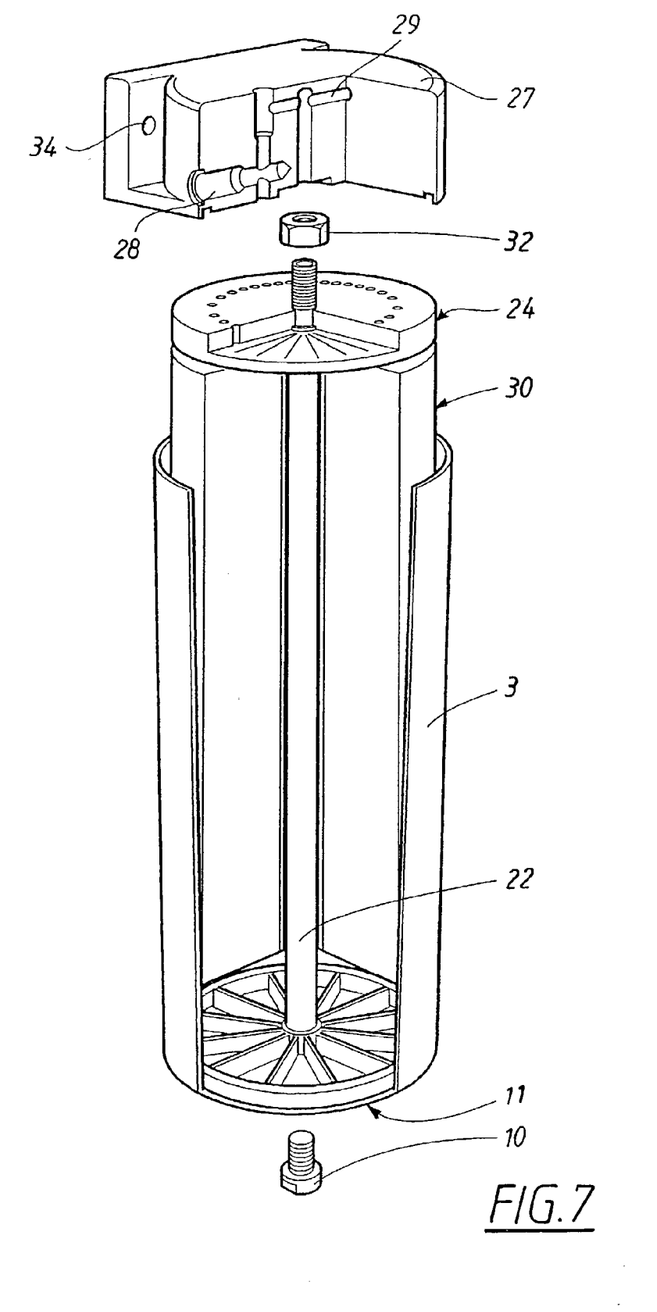
FIG. 7 is a corresponding exploded view, but completed in order to form a complete liquid cleaner according to the invention.

The hub 22, or the central tube of the cleaner housing, is fixedly arranged in the bottom element 11 and extends with its top end some distance above the casing wall 3 of the cleaner housing see FIG. 6. The cleaner housing comprises, except a bottom element 11, a top element 24 forming a compression element and a distribution element for the liquid to be cleaned, for example oil. The compression element 24 exhibits a central bore 25, allowing the compression element 24 to be fitted onto the central tube. The compression element further exhibits a number of distribution channels 26, including radial through channels for allowing distribution of the liquid intended to be supplied under pressure to the topside of the compression element 24. To this end, as is shown in FIG. 7, a closing upper end cover 27 is provided, incorporating both an inlet duct 28 for the liquid and an outlet duct 29 for the cleaned liquid. The inlet duct communicates with the top side of the compression element outside of the central tube 22, whilst the outlet duct communicates with the internal cavity of the central tube, which in turn communicates with the area below the cleaning insert.

Figure 8:
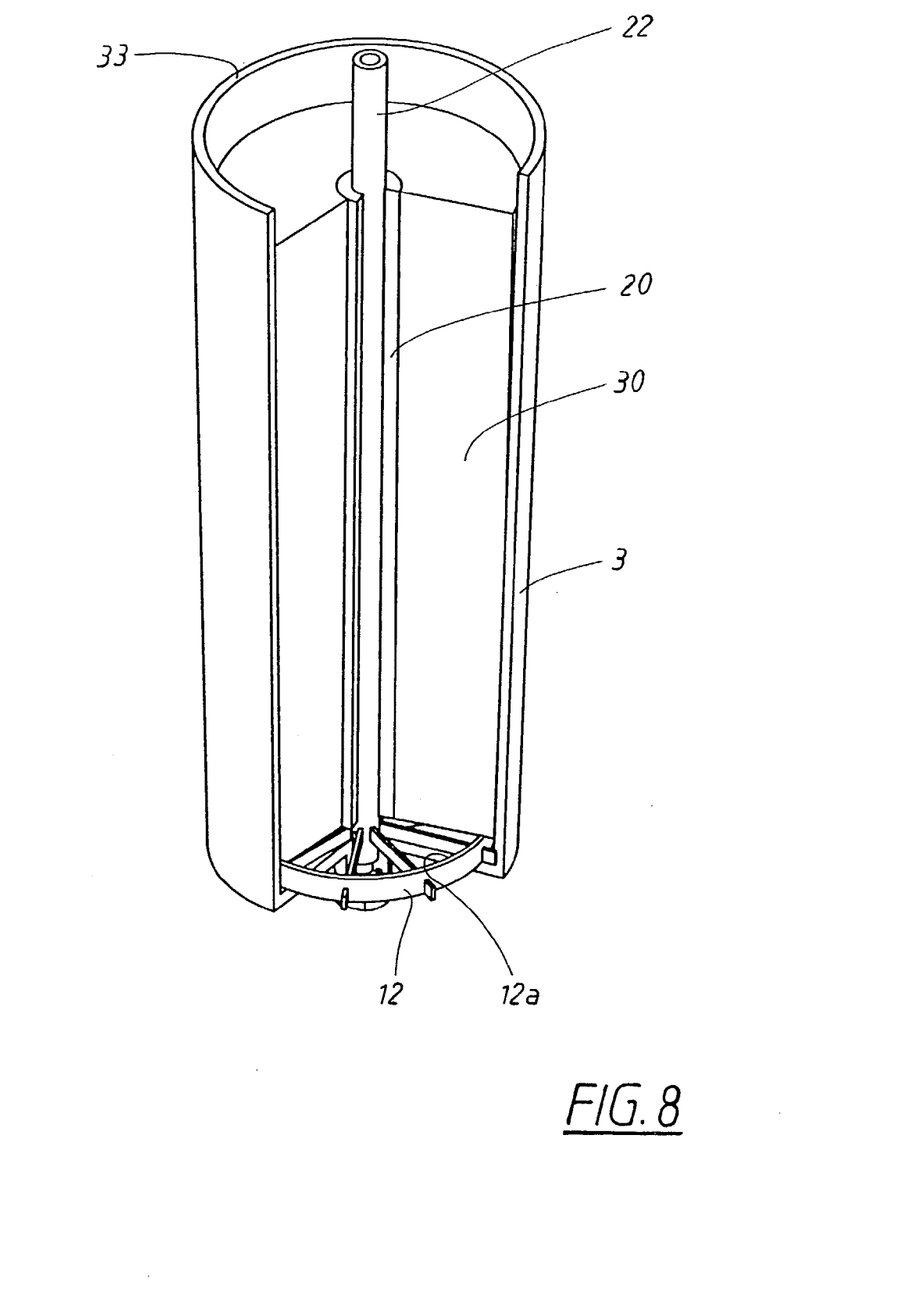
FIG. 8 is a partly sectioned perspective view of the liquid cleaner, with the cleaning insert in a final position, but with the top end head covers removed for the sake of clarity.

According to the invention, the complete liquid cleaner is accomplished by inserting the cleaning insert 30, as best shown in FIG. 6, from above through the top aperture 5 of the cleaner housing 1. The diameter $d_2$ of the cleaning insert is smaller than the diameter D at the top of the cleaning chamber, thus allowing the cleaning insert to be inserted, without resistance, some distance into the cleaner housing. The hollow core 20 of the cleaning insert is hereby slipped onto the central tube 22. Somewhere between the top and bottom ends of the cleaning chamber, the envelope surface of the cleaning insert 30 contacts the inside 7 of the cleaning chamber wall, that is, at the height where the diameter of the cleaning chamber corresponds to the diameter $d_2$ of the cleaning insert, i.e. at two thirds of the height of the cleaner housing, or maybe at half the height. Then a resistance occurs, whereupon the cleaning insert has to be pushed down into the cleaner housing either manually or by means of some pressing device able to apply a pressing force in the axial direction, i.e. in the direction of the geometrical axis 6, towards the bottom element 11 of the cleaner housing. Through the compressibility of the cleaning insert, the latter is compressed progressively in the radial direction over at least a portion of the height of the cleaning insert, because the casing wail 3 of the cleaner housing is shape permanent. The cleaning insert is dimensioned so that it can be pushed down against the bottom element 11 in such a way that the lower, substantially planar end surface 31 of the cleaning insert is pressed against the top edge 12a of the ring portion 12, which, due to its knife-edge shape, can penetrate somewhat into the cleaning insert, allowing the end surface 31 to abut the supporting surface of the spokes 13. In a last stage, the pressing force is obtained by sliding the compression element 24 onto the central tube 22. Said central tube exhibits a threaded portion at the top, extending above the compression element allowing a nut 32 to be screwed on, which, through tightening thereof by means of a tool, achieves the final compression and maintains the cleaning insert in its final position, as shown in FIG. 8. The cleaning insert will hereby leave a clearance to the top edge 33 of the cleaner housing to provide space for the compression element 24, which is not, however, shown in FIG. 8. The assembly of the liquid cleaner is concluded by attaching the upper end cover 27 so as to sealingly abut the top edge 33 of the cleaner housing. The upper end cover 27 preferably exhibits mounting flanges 34 for attachment of the liquid cleaner to e.g. a stationary wall at the installation in question. Inlet and outlet lines are finally connected to the inlet 28 and the outlet 29 ports, respectively, which may hereby be arranged at the same end of the housing.

The liquid to be cleaned consists of oil, e.g. vegetable oils, but primarily mineral oils, such as rock oil, or synthetic oils. The oil may be a fuel for an internal combustion engine, such as diesel oil, or lubrication oil for a combustion engine, for lubricating bearings etc. The liquid is fed under pressure into the inlet 28 and is distributed by the distribution element 24 so as to distribute the liquid over the top end surface 35 of the cleaning insert. The liquid will flow under pressure, e.g. above 1 bar, principally in the axial direction, through the cleaning insert, and cannot pass between the insert and the casing wall of the cleaner housing, as the cleaning insert has been arranged to generally fill the cleaning chamber and to contact the casing wall inner surface 7. This condition is preferably secured also at the top end of the cleaning chamber, by said insert being subjected to an axial compressing force, whereby, at the top end, a certain radial expansion will also occur of the cleaning material in the outward direction, toward the casing wall. However, a distance to the casing wall at the top end is not important. The knife-edge shaped circumferential top edge of the knife-shaped portion penetrating into the bottom end of the cleaning insert will ensure that all the oil must pass through the insert and be cleaned. The liquid will be cleaned during its passage through the cleaning insert, by absorption of unwanted constituents. Insoluble particles as well as some dissolved components of the liquid will be absorbed in the cleaning material. Preferably, a cleaning material is selected that contains cellulose fibres of the tubular type, extending generally in the axial direction. Through the radial compression of the cleaning insert, increasing gradually towards the lower end, which in the cleaning insert defines the outlet end, a gradually increasing compaction of the cleaning material is taking place in the downwards direction, more precisely a compaction of the tubular fibres. This will create an increased degree of cleaning, such that even oxidation products in the oil will remain in the cleaning material, as will water. Through capillary effects within the tubular fibres, water will be retained in the cleaning insert, whereas oil will flow through. Contrary thereto, additives in the oil will be allowed through, maintaining the favourable properties of the oil, whereas contamination and ageing products will be caught in the cleaner. Through the continuous compaction of the cleaning material in the flow direction of the liquid, a maximum distribution and a continuous increase of the cleaning effect is enabled. This provides for a maximum cleaning function. Tests have shown that particles down to a size of 0.1 microns are collected in the cleaner according to the invention. Thus, the cleaner can separate and collect all particles in the oil that cause friction and thereby increase the rate of oxidation, i.e. the ageing, of oils.

Figure 9:
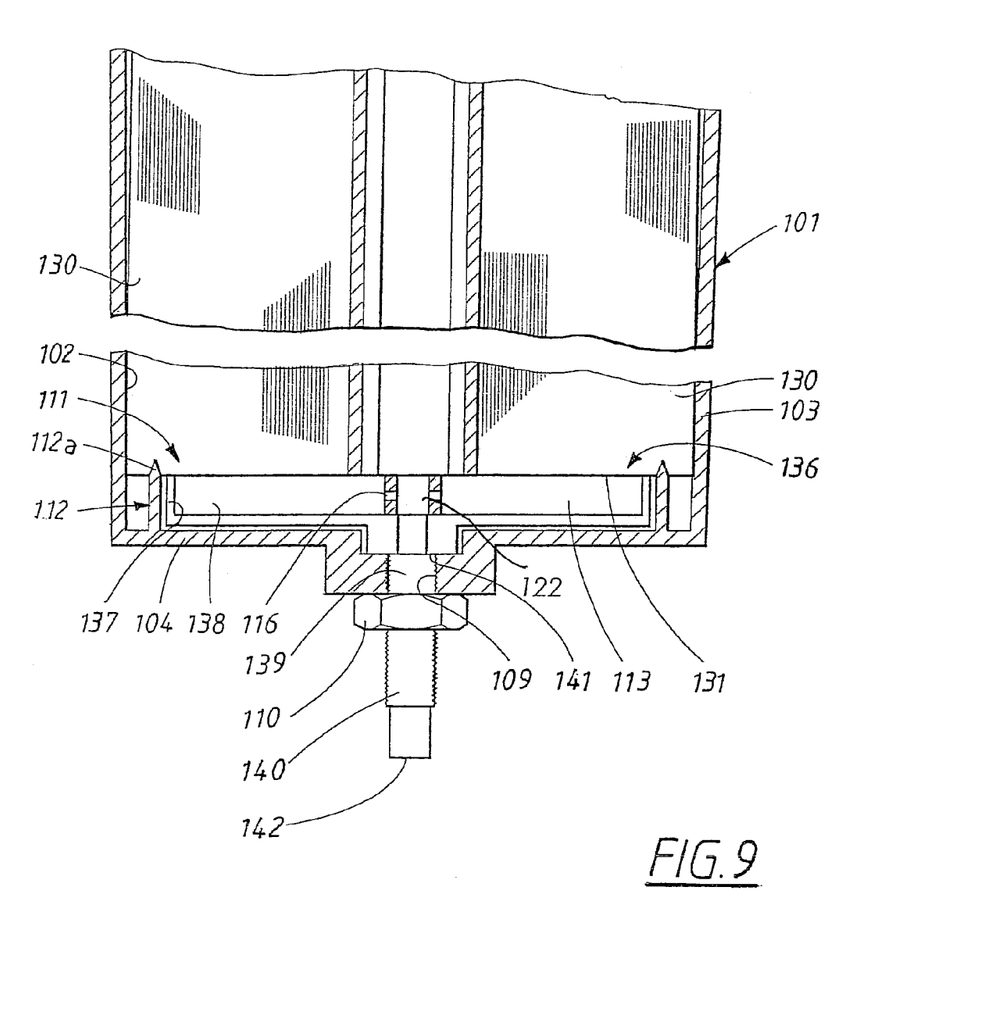
FIG. 9 is a partial longitudinal cross-section through the liquid cleaner in a second embodiment.

FIG. 9 illustrates an alternative embodiment example, where the corresponding elements are denominated with the addition of 100. The bottom element 111 is in this example divided such that the circumferential ring portion 112 is separate from the rest of the bottom element. Here, the ring portion 112 is fixedly attached to (integrated into) the lower end wall 104 of the cleaner housing 101. Instead, the rest of the bottom element is preferably a separate unit 136 from the cleaner housing, resting on the end wall portion 104. The separate unit 136 is in this example completed with a second, ring-shaped portion 137, together with the spokes 113 defining distance elements for supporting the cleaning insert 130.

FIG. 9 also shows that the knife-shaped top edge 112a of the fixed ring portion 112 penetrates the cleaning insert 130 from its bottom side 131 whilst the cleaning insert is supported by the distance elements 137. Hereby the "outlet end" of the cleaning insert, i.e. its bottom side 131, is circumferentially sealed against any not cleaned liquid passing at the casing wall of the cleaner housing, whilst at the same time creating a space 138 for the passing out and flow of cleaned liquid radially inward, towards the outlet tube 122 for axial discharge. From the space 138, the liquid can access the interior of the tube 122 via one or more openings 116. From FIG. 9 it may also be gathered that the cleaning insert 130 bears tightly on the wall of the cleaning chamber 102 at least at its lower end, and might be allowed, at the top of the cleaning chamber, to define a distance to said wall, without deteriorating the cleaning function.

From FIG. 9 it may further be gathered that the bottom plug 110 in this example has two screw portions, one shorter screw portion 139, normally screwed into the bottom hole 109 and having a length shorter than, or equal to, the depth thereof. The other screw portion 140, which does not need to have a longer thread than the first screw portion, has a total length that exceeds the depth of the hole. Further, the separate unit 136 of the bottom element 111 has a shoulder or contact surface 141 that extends radially into the hole 109.

With the embodiment according to FIG. 9, the following measures may be taken when replacing a cleaning insert. Initially, like in the first example, the cleaner housing 101 is removed from the upper end cover 27, whereupon the nut is screwed off and the compression element 24 is removed. The bottom drain plug is then unscrewed, turned around and screwed in again, now with the longer portion 140 in the hole 109. When the plug has been screwed in so that the end 142 of said portion abuts with the shoulder 141, the separate unit 136 of the bottom element 111 is pushed axially upwards and will push out the cleaning insert 130 somewhat from the cleaner housing. Hereby, the entire filter can be held upside down, allowing easy removal of the cleaning insert.

Figure 10:
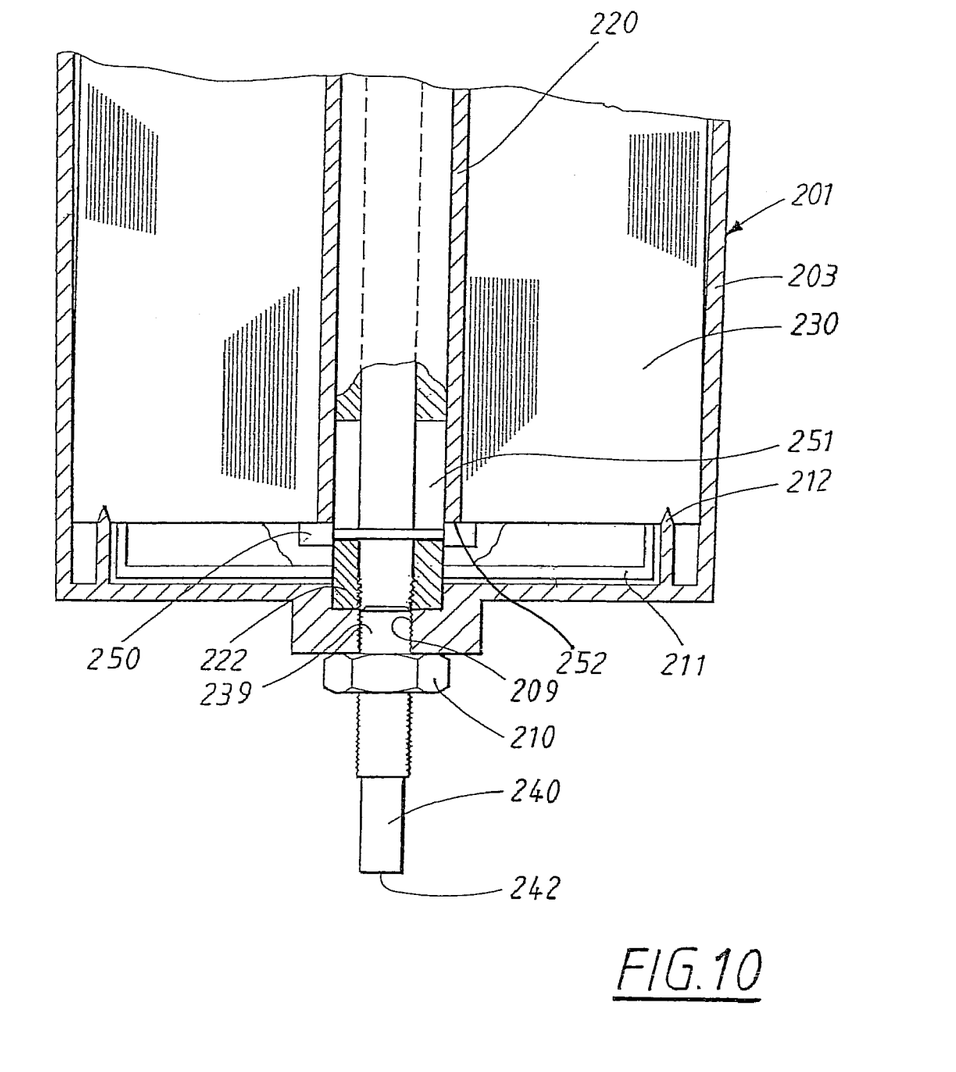
FIG. 10 is a corresponding section through the liquid cleaner in a third embodiment.
Figure 11:
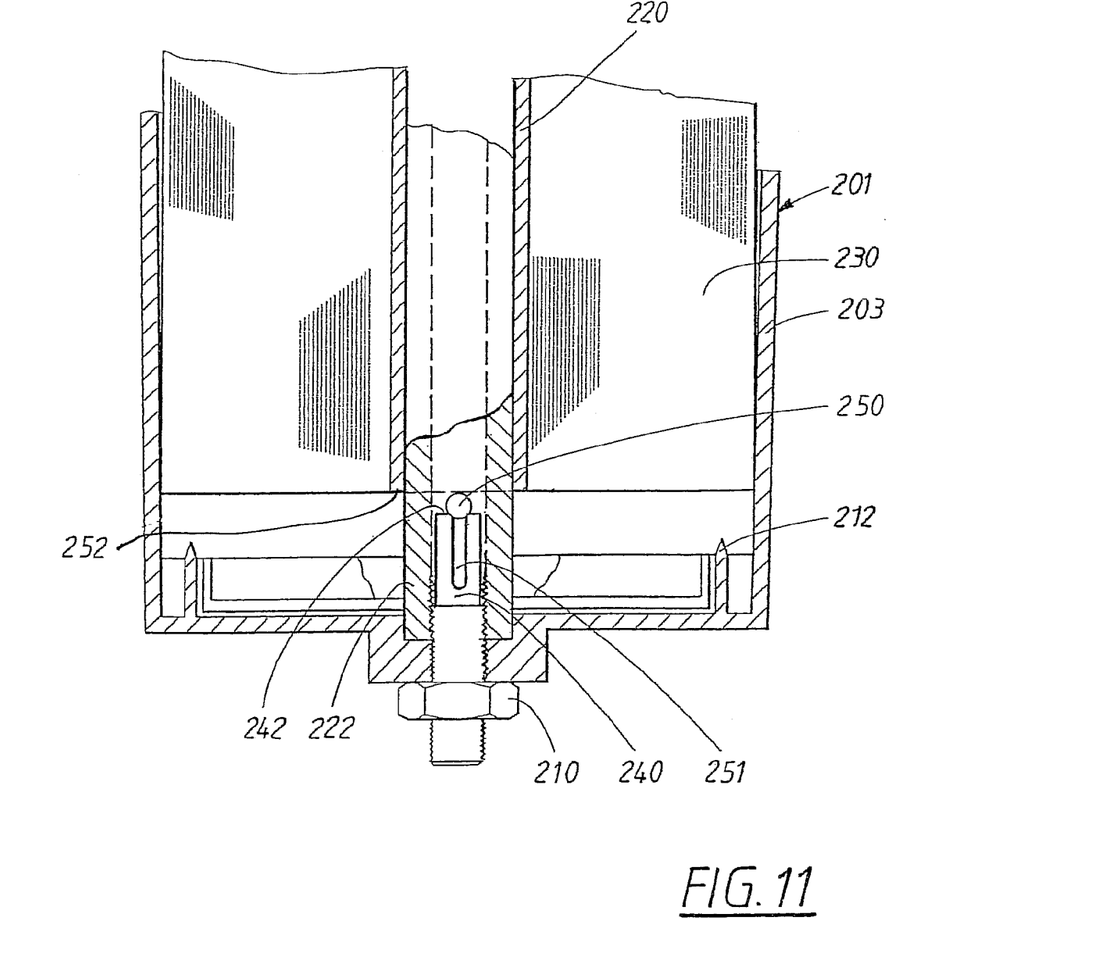
FIG. 11 is a longitudinal cross-section at right angles to the cross-section of FIG. 10.

FIGS. 10 and 11 show an alternative embodiment, where the central tube 222 extends downwards through the central aperture of the bottom element 211. In this case the bottom plug 210 is screwed into threads in the central tube. A lifting element 250, in the illustrated example a pin extending laterally through the central tube, is axially displaceable in relation to said central tube. More precisely, said pin extends through two oppositely located elongated slots 251, extending axially in the central tube 222. The pin 250 is longer than the external diameter of the central tube and thus extends below the lower edge 252 of the tube-shaped core 220 of the cleaning insert 230, which forms a sleeve around the central tube. Advantageously, the pin has at its ends a larger diameter than the width of the slots, except for at one end of the slots. Through this design, the pin is locked and cannot fall out during normal movements. The bottom plug 210 may be of the same turn-around type as in FIG. 9, and is shown in FIG. 10 with its shorter screw portion 239 screwed into the bottom hole 209. The lifting element 250 is then in a lower, non-active mode, whereby the cleaner is in an active state, i.e. an operating mode. With the longer portion 240 inserted into the central tube, the end surface 242 of the plug is able to push up the pin 250, thereby lifting the cleaning insert 230 away from the bottom element 211 and away from the knife-shaped portion 212, see FIG. 11. Due to the conical shape of the cleaning chamber 202 and the cleaning insert 230, the insert is released from its depressed state and may easily be lifted out of the cleaner housing 201 after the initial lifting motion. As in the other embodiments, initially the opposite end of the cleaner housing, i.e. the upper end cover, has been removed. The slots 251 may advantageously also function as flow passages, allowing the liquid to flow into the interior of the central tube and then out through the outlet The invention has been described above as a method and a device for the cleaning of liquids, even if a technique is used reminding of, and as such could be regarded as falling within the category of, filtration or separation of substances and/or water from a non-aqueous fluid, such as oil. However, as conventional filtration, especially of oils, results in a relatively low degree of cleaning, the term filtration has been avoided in order to emphasise the high-degree cleaning according to the invention. One might also us the term collector, i.e. a collector of contamination, or talk about a continuous maintenance of the liquid, i.e. measures for maintaining the intended properties of a liquid during its maximum service life, instead of exchanging the liquid at repeated exchange intervals.

Thanks to the invention, oil maintenance can be achieved through such a high-degree cleaning that a liquid may in principle be re-used and circulated within a system without time limitation. This means that the number of oil changes in a car engine could practically be reduced by 90–95%, thus bringing enormous benefits with regard to environment and economy. The cleaner can in principle be fitted in any arbitrary direction, e.g. lying, i.e. with a horizontal longitudinal axis, inclined, or upside down.

The invention claimed is:

1. A liquid cleaner, comprising a cleaner housing and a cleaning insert, said cleaner housing having a closed, inner end and an openable outer end, and a cleaning chamber located between said ends, wherein said cleaning chamber has a casing wall defining the shape of a frustrum of a cone, expanding towards the outer end, and in that the cleaning insert in its initial state, outside of the cleaning chamber, is substantially cylindrical and consists of a compressible cleaning material, and wherein a detachable bottom element is located at the inner end, exhibiting on the one hand a circumferentially closed edge portion having a knife-like edge functioning to penetrate into one end surface of the cleaning insert at a position to define a clearance to the casing wall, and on the other hand distance elements supporting the insert at a distance from the inner end, thus maintaining a space for receiving liquid.

2. The liquid cleaner according to claim 1, wherein the cleaning material comprises tubular fibres, with a substantial fibre direction extending axially.

3. The liquid cleaner according to claim 1, wherein the cleaning material is cellulose fibres.

4. The liquid cleaner according to claim 3, wherein the cleaning insert comprises a tightly wound roll made from a paper web having its principal fibre direction located laterally, across the longitudinal direction of the web.

5. The liquid cleaner according to claim 1, wherein the cleaning insert is provided with a through axial central bore and in that the cleaner housing exhibits a central tube, affixed to the bottom element and provided at the outer end with compressing means, functioning to compress the cleaning insert axially into the cleaning chamber.

6. The liquid cleaner according to claim 5, wherein said compressing means comprise a compression plate and a nut arranged for screwing onto a threaded portion of the tube, which has a length exceeding the axial length of the cleaning insert.

* * * * *